Aug. 18, 1970        E. GOVE        3,524,350
CARD-MOUNTED THERMOMETER AND METHOD OF MAKING THE SAME
Filed Jan. 27, 1969        2 Sheets-Sheet 1
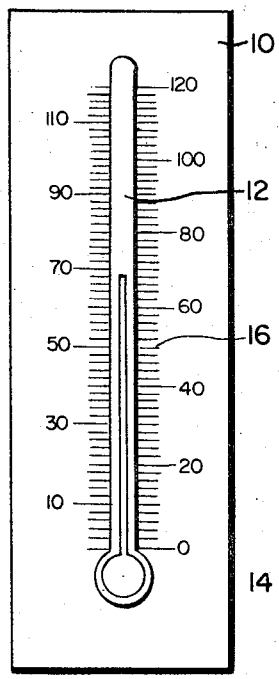
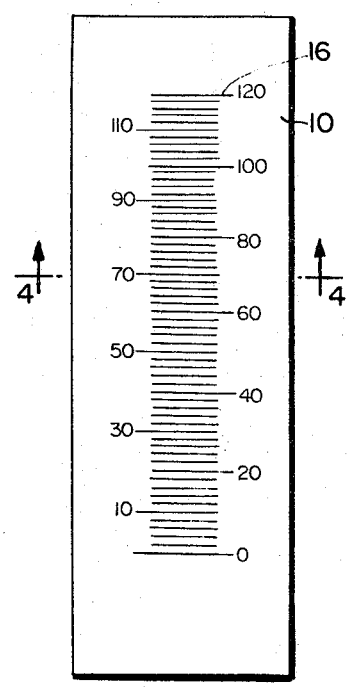
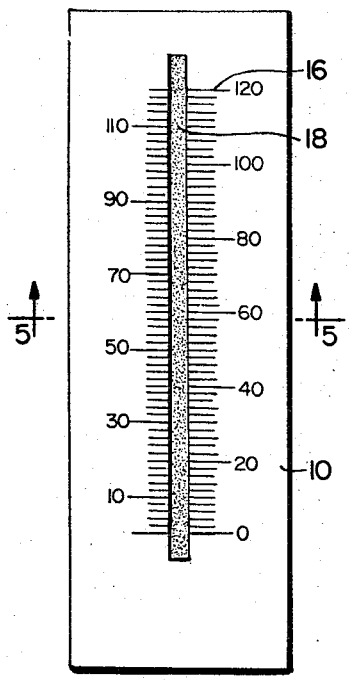
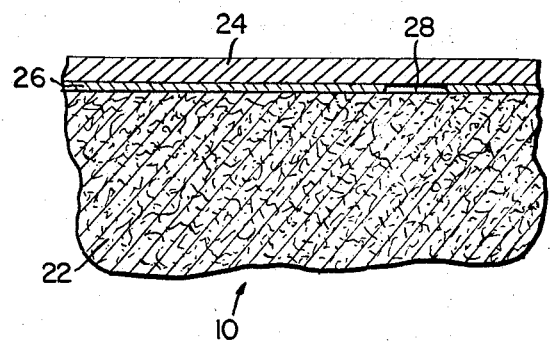
INVENTOR
EDWARD GOVE
Albert H. Kichner
ATTORNEY Aug. 18, 1970          E. GOVE          3,524,350

CARD-MOUNTED THERMOMETER AND METHOD OF MAKING THE SAME

Filed Jan. 27, 1969          2 Sheets-Sheet 2

INVENTOR
EDWARD GOVE

ATTORNEY

United States Patent Office 3,524,350
Patented Aug. 18, 1970

3,524,350
CARD-MOUNTED THERMOMETER AND METHOD
OF MAKING THE SAME
Edward Gove, Ocean City, N.J., assignor to Hartley
Gove Sons, Inc., Brookhaven, Miss., a corporation of
Mississippi
Filed Jan. 27, 1969, Ser. No. 794,160
Int. Cl. G01k 1/14
U.S. Cl. 73—376    10 Claims

ABSTRACT OF THE DISCLOSURE

A mounted thermometer is supported by a backing card of fibrous stock having a hard surface on which the thermometer temperature scale is printed. An elongated shallow trough-like depression, routed or pressed into or through the surface to expose some of the internal soft fibers, is then filled with adhesive which penetrates the fibers thus exposed. The glass tube thermometer is disposed on the adhesive so as to cover it and be securely bonded to the card, independently of the card surface, which may be hard, glossy, and incapable of making good bond with the adhesive.

BACKGROUND OF THE INVENTION

The invention relates to card-mounted thermometers, and particularly to such small ones as are made at low unit cost and are sold in large quantities generally to manufacturers of advertising novelties, souvenirs and the like who use them as parts of various kinds of plaques, knicknacks, ornaments, calendars and the like which are in many cases distributed as giveaway items, and which are used by the ultimate recipients to put on a desk or table or hang on the wall of a room for the purpose of indicating the air temperature thereof.

These card-thermometers are of necessity simple and capable of being mass produced, and they must be made at low cost if their manufacturers are successfully to compete with the makers of other advertising novelties. The glass tube, having a bore of tiny diameter filled with a column of temperature-responsive liquid, can be made at modest cost with sufficient performance accuracy for the purpose, and the printing of the backing cards, cut from suitable cardboard stock, involves very little expense. However, assembly of the tubes onto the cards, in proper relation of the top level of the column to the printed scale, in a practical, attractive and permanent union of tube and card, has presented a real problem, the solution of which is the primary purpose and object of the present invention.

Clamping the tube to the card by metallic U-shaped wire staples has been widely practiced but is objectionable for several reasons: the staples are unattractive; they obscure those zones of the liquid column which are behind them; they can become loose if indeed they are originally made tight on the glass; and they are subject to ultimate rusting and corroding.

Cementing the tube to the backing has proven to be impractical because no otherwise acceptable adhesive makes a satisfactory permanent bond with the surface of the preferred backing elements which, for reasons of economy consonant with good appearance, must generally be hard, glossy surfaced cardboard in order to undersell the more costly backings of metal, wood, molded plastic and the like.

The present invention provides a commercially successful combination of glass tube and inexpensive cardboard type backing securely, permanently and attractively united by a simple and inexpensive manufacturing process.

BRIEF DESCRIPTION OF THE DRAWINGS

In the accompanying drawings, which illustrate certain presently preferred embodiments of the invention:

FIG. 1 is a plan view of a completed thermometer embodying the invention and made in accordance with the new method;

FIG. 2 is a similar view of the backing element per se as cut and printed, prior to formation of the tube-locating depression;

FIG. 3 is a similar view of the backing element of FIG. 2 after formation of the tube-locating depression;

FIG. 4 is a detail transverse sectional view, on a relatively enlarged scale, taken on the line 4—4 of FIG. 2;

DESCRIPTION OF THE PREFERRED EMBODIMENTS

Figure 5:
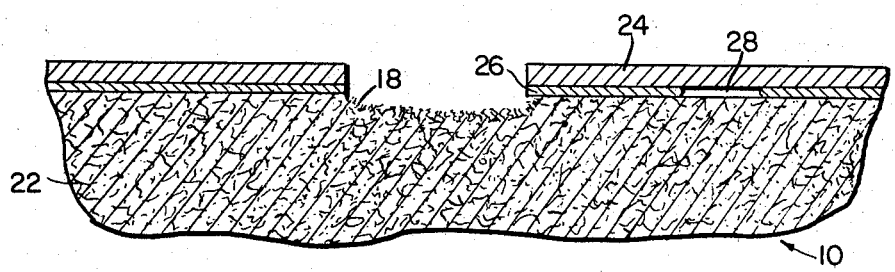
FIG. 5 is a detail transverse sectional view, on the scale of FIG. 4, taken on the line 5—5 of FIG. 3.

In these drawings the reference numeral 10 designates generally a backing element or card on which is mounted the glass tube 12 of a conventional, well known type of room thermometer. The tube is of slender more or less cylindrical or cross sectionally triangular shape throughout most of its length, having an enlarged bulb at its lower end and a sealed top end, and enclosing a bore of very small diameter containing any type of suitable temperature-responsive liquid, such as the commonly used petroleum derivative having an appropriate coefficient of expansion and colored by a dye that makes good contrast with the color of the backing element.

The backing element is printed with the thermometric scale 16, comprising conventional graduations and degree numerals.

One conventional and acceptable mode of producing the completed tube and establishing its proper relation to the backing element, which can be employed as the preliminary series of steps in the practice of the present invention, comprises the following:

A predetermined quantity of the liquid is put into the tube through the open top end and the tube is then warmed to a predetermined temperature, the upper end is sealed, and the tube is then cooled to another predetermined temperature, and then a "test point" in the form of an etched scratch is made to show the top of the liquid column at that test temperature. The tube is then affixed to the backing element in such position that the tube's test point will be opposite the degree of the preprinted scale which corresponds to the test point temperature.

In the prior art the affixation of the tube to the backing element has presented problems and various ways and means have been tried for accomplishing the connection in the simplest and least expensive manner commensurate with permanence, good appearance, and good visibility of the liquid column and the scale. The general commercial practice has largely settled down into using, as the least objectionable mounting means, small U-shaped metallic staples spanning the tube at two widely spaced points, penetrating the backing element, which is generally a card of heavy paper or cardboard stock, and clinched over on the back of the card. When properly and carefully applied, these staples do hold the tube securely in place, but they are unsightly, they obscure two potential levels of the liquid column, and they are subject to rusting or corrosion with resultant staining of the card and deterioration of the assembly.

Elimination of the staples and substitution of cements has not proved satisfactory because of unresolved difficulties in effecting a good bond of the cement with the backing element, particularly when the backing element is a card of heavy paper or cardboard stock provided with the smooth, hard surface or surface coating that the trade prefers and which is best suited for reception of the printing ink.

As has been stated hereinabove, the principal objective of the invention is to provide an adhesive bond of tube to card that will be permanent, of good appearance, unobtrusive, and commercially inexpensive to make.

The new product is made by certain novel procedure including method steps which begin with the pre-printed card shown in FIG. 2 and the finished tube 12 that has been filled, sealed and test pointed as hereinabove explained.

The first step, which is practiced on the card 10 of FIG. 2, consists in forming in the card surface the elongated narrow trough-like depression shown at 18 in FIG. 3. As there appears, the depression extends substantially the full length of the scale 16, bisecting the graduations, which remain clearly exposed on opposite sides of the depression, and by reference to FIG. 1, as well as FIGS. 6, 7 and 8, it will be noted that the width of the depression is equal to or slightly less than the width of the tube 12. Actually, as will appear from FIGS. 1 and 3, the length of the depression is a function of the length of the tube that is to be mounted on the card, and the significant factor in determining the depression length is the length of the tube, so that the tube can be fully nested in the depression, as will shortly appear.

It is important that the depression 18 be made through the surface or surface coating of the card 10 and that if indeed the depression does not actually remove such surface or coating, hereinafter referred to simply as surface, then it must break, rupture or interrupt the surface sufficiently to expose some of the underlying fibers of the material.

A preferred manner of forming the depression is to rout a narrow channel in the card, with removal of the surface along the full length of the resultant trough. This of course quite completely exposes the soft underlying or interior fibers of the card material in the bottom and along the side walls of the depression.

In some cases, particularly when an adhesive of low surface tension and low viscosity is to be used, I have found it practical to form the depression by pressure-indenting it into the card. This is satisfactory with such card materials as include a surface that will respond to such indenting operation by breaking and rupture sufficiently to expose interior fibers through cracks and crevices formed in the surface.

In either case the card is provided with a trough-like depression of proper length and width to accommodate the thermometer tube that is to be mounted on the card, and of a depth sufficient to expose, in the relatively soft interior of the card material, fibers that are capable of cooperating in the next step of the method, by absorbing and accepting the adhesive application in good tight bonding relation.

Figure 6:
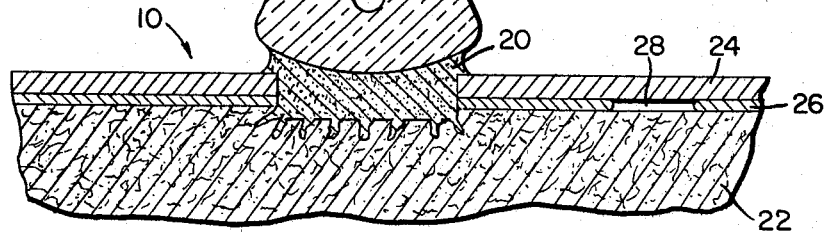
FIG. 6 is a view similar to FIG. 5, but showing the adhesive applied and the tube located in position.
Figure 7:
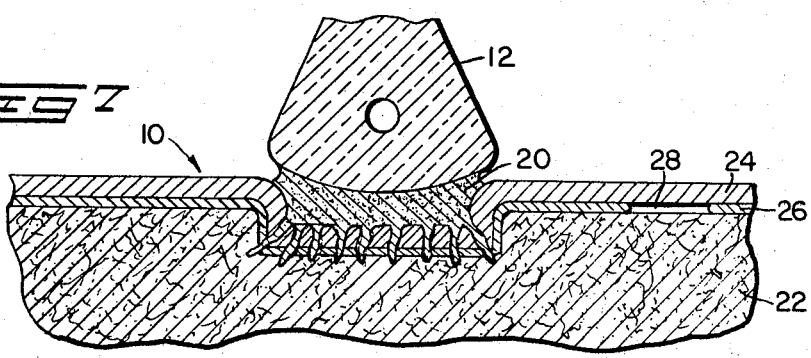
FIG. 7 is a view similar to FIG. 6, but showing a modified form of the invention.
Figure 8:
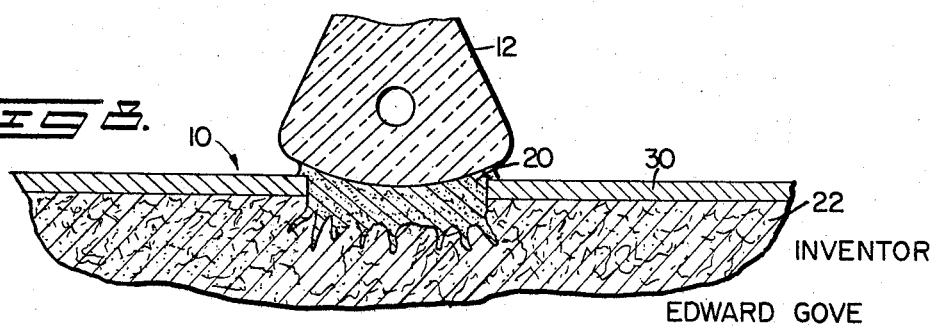
FIG. 8 is another view, similar to FIGS. 6 and 7, but showing a still further modified form of the invention.

This next step, therefore, consists in filling or substantially filling the depression with a quantity of adhesive 20, as shown in FIGS. 6, 7 and 8.

The adhesive is preferably one of the latex emulsion or polyvinyl types. Two adhesives which have been used with satisfaction and success, and which may be mentioned by way of example but by no means limitation, are Swift & Company's #4007 and H. B. Fuller Company's P-3801.

The glass tube is then applied to the adhesive filling the depression, and if the depression depth and width and the quantity of adhesive have been properly related, the result is such as shown in FIGS. 6, 7 and 8. That is to say, the adhesive has penetrated down and to some extent laterally into the fibers of the card, filling the depression, and forming a mounting bed for the tube, preferably spreading slightly beyond the edges of the depression, and making good wide contact with the whole bottom area of the glass that spans the width of the depression.

When the adhesive has set, the bond is found to be unusually good, with the adhesive making continuous unbroken contact with the bottom surface of the tube and penetrating into the card material in which virtually amounts to a keying interfit among the fibers.

The thus completed product, shown in FIG. 1, will be found to have achieved the objects of the invention: the appearance being good inasmuch as there is no disfigurement by staples and no evidence of the adhesive which is well covered by the glass, and the connection of the tube to the card being extraordinarily tight, secure and permanent.

It is to be understood that, for clarity of illustration of the invention as hereinabove explained and described, some of the physical features of the structure have been exaggerated in the drawings. Thus, it is probable that the penetration of the adhesive, particularly if it be applied to the depression in a not too viscous condition, will be in inter-fiber spaces and crannies more closely spaced than would appear to be suggested in FIGS. 6, 7 and 8. It may be, too, that the penetration is not as deep as there indicated. Such details and relative dimensions and quantities are not considered important, as long as the adhesive does contact the fibers of the card and be absorbed down thereinto, by capillary attraction or otherwise, as will be understood.

It will be appreciated that the invention depends in part on selection of a card of internal fibrous structure as the backing element of the combination. For proper printing and general appearance the surface of such card should be harder and more dense than the relatively soft interior which is exposed, at least in part, by the depression-forming operation, and it is immaterial to the invention just how, or of what if any added material, that surface is formed. It is in this respect that the details of the invention may be modified within the broad generic concept that is the subject of the more broadly worded of the appended claims.

Thus, a very simple and in many respects preferred embodiment of the invention involves use of a backing element made of newsback cardboard stock 22, FIG. 4, to which is adhered a surface sheet 24 of smooth, hard sheet material such as calendered paper by means of an intervening layer 26 of suitable glue or the like.

As shown in FIG. 5 on the same exaggerated scale as FIG. 4, the depression 18 is routed or otherwise cut entirely through the two surface layers of hard sheet material and adhesive, down into the relatively soft fibrous interior of the newsback 22, and as suggested in FIG. 6 the adhesive filling 20 penetrates among the fibers of the newsback and not, at least to any appreciable degree, into the harder and less absorptive material of the surfacing 24 or the glue 26.

As obtained from the mill, the hard surfaced newsback stock is frequently characterized by relatively poor adhesion of the surface film or layer, resulting from the presence of voids in the glue layer. One of these is indicated at 28 in FIGS. 4, 5, 6 and 7. It is largely because of such voids, where of course the surface paper or other finish layer is capable of being relatively easily pulled from the backing, that bonding the glass tube directly to the flat uninterrupted surface (unbroken by the trough depression of the present invention) is not practical. The reason is that even if the adhesive, like that used by the present invention, did make good bond with the surface material 24, as it does with the glass of the tube 12, the tube might be quite readily pulled from its place on the card by tearing the surface material loose in the regions of the voids 28.

Of course this possibility is obviated if the surface material, with its voids 28, be removed as in FIGS. 3 and 5, or even if the card be pressure-indented sufficiently to break the surface material for transmission of the adhesive 20 down into the newsback fibers, as indicated in FIG. 7.

FIG. 7, it will be understood, differs from FIG. 6, only in that the depression was pressed into the newsback body of the stock, with concomitant rupture of the surface 24 as shown, rather than being routed or otherwise cut with consequent removal of surface material.

In the figures thus far discussed in detail, the surface 24 has been described as hard, smooth calendered paper. It could as well be some other, generally equivalent sheet material, such as a metallic foil, e.g., aluminum, adhesively bonded to the newsback by the layer 26.

FIG. 8 illustrates another kind of card stock with which the invention can be practiced. This is a foundation or body of fibrous material, such as the newsback 22, surfaced directly with a coating, film or layer 30 of clay, lacquer, plastic or the like, directly bonded to the foundation material without the intervention of any adhesive. In this case the depression may be formed by cutting through the surface 30, down into the foundation to expose the fibers thereof, as shown.

It is believed to be evident from the foregoing that the structure as illustrated and described accomplishes the objectives set out in this specification.

It is to be understood that these structures are given by way of exemplification only, and not limitation, and that the spirit of the invention can be embodied in other and further modified forms within the scope of the appended claims.

I claim:

1. A mounted thermometer comprising a backing element of fibrous sheet material having a smooth surface which is not well adapted to form a good bond with an adhesive and having an interior fibrous structure capable, upon exposure, of being penetrated by adhesive and having said surface interrupted by an elongated shallow trough-like depression exposing fibers in said interior, and a glass thermometer tube of substantially the length of said depression mounted in the depression and secured to the backing element by a quantity of adhesive in the depression bonded to the tube and to said exposed fibers.

2. A mounted thermometer as claimed in claim 1 in which the backing element is a card of newsback having a hard surface.

3. A mounted thermometer as claimed in claim 1 in which the backing element is a card of newsback having a hard surface layer of calendered paper.

4. A mounted thermometer as claimed in claim 1 in which the backing element is a card of newsback having a hard surface comprising a solidified coating directly applied to the newsback.

5. A mounted thermometer as claimed in claim 1 in which the backing element is a card of newsback having a hard surface comprising a ply of metallic foil adhesively secured to the newsback.

6. A mounted thermometer as claimed in claim 1 in which the backing element depression is a channel cut into the fibrous material with removal of all surface material from overlying relation to the bottom of the channel.

7. A mounted thermometer as claimed in claim 1 in which the backing element depression is pressure-indented into the backing element with rupture of the backing element surface to expose internal fibers in the element.

8. A method of making a mounted thermometer comprising:
forming, in a backing element of fibrous sheet material having a smooth surface which is not well adapted to form a good bond with an adhesive and having an interior fibrous structure capable, upon exposure, of being penetrated by adhesive, an elongated shallow trough-like depression exposing underlying fibers in the sheet,
depositing a quantity of adhesive in said depression, disposing on said adhesive a glass thermometer tube, and allowing the adhesive to penetrate said exposed fibers and set in good bonding relation with said fibers and said tube.

9. The method claimed in claim 8 in which the depression is formed in the backing element by cutting and removing surface material therefrom.

10. The method of claim 8 in which the depression is formed in the backing element by pressure-indenting the surface of the backing element so as to break said surface and form a plurality of cracks through which the adhesive can pass into bonding relation with fibers within the element.

References Cited

UNITED STATES PATENTS

| 2,072,444 | 3/1937 | Dorfmann | 73—376 |
| 2,146,394 | 2/1939 | Hiergesell | 73—376 |
| 3,099,162 | 7/1963 | Imperial et al. | 73—376 |
| 3,199,000 | 8/1965 | Nippert. | |

FOREIGN PATENTS 592,012  4/1959  Italy.

LOUIS R. PRINCE, Primary Examiner

D. M. YASICH, Assistant Examiner